Figure 1:
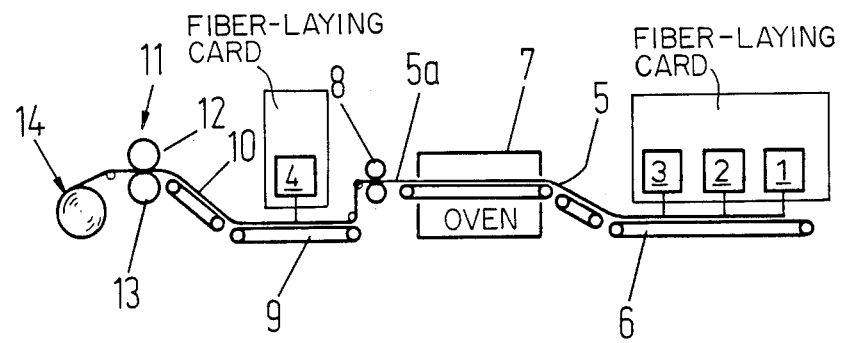

United States Patent [19]

Buchwald et al.

[11] Patent Number: 4,724,501
[45] Date of Patent: Feb. 9, 1988

[54] JACKET FOR FLOPPY DISK

[75] Inventors: Holger Buchwald, Hemsbach; Werner Schäfer, Birkenau; Peter Hartwig, Weinheim, all of Fed. Rep. of Germany

[73] Assignee: Firma Carl Freudenberg, Weinheim, Fed. Rep. of Germany

[21] Appl. No.: 715,470

[22] Filed: Mar. 25, 1985

[30] Foreign Application Priority Data

Jul. 14, 1984 [DE] Fed. Rep. of Germany ....... 3425990

[51] Int. Cl.$^4$ ............................................. G11B 23/03
[52] U.S. Cl. .................................. 360/133; 206/313; 206/444
[58] Field of Search .............................. 360/133, 137; 206/309-313, 444

[56] References Cited

U.S. PATENT DOCUMENTS 4,413,298 11/1983 Pecsok et al. ...................... 360/133
4,414,597 11/1983 Cornin ................................ 360/133
4,568,994 2/1986 Lynch ................................. 360/133

FOREIGN PATENT DOCUMENTS 0094966 6/1982 Japan ................................. 360/133
0001864 1/1983 Japan ................................. 206/313
2096194 10/1982 United Kingdom .

Primary Examiner—A. J. Heinz
Assistant Examiner—David J. Severin
Attorney, Agent, or Firm—Felfe & Lynch

[57] ABSTRACT

A jacket for a floppy disk consists essentially of a porous nonwoven material both for a writable cover function and a soft, fibrous liner function.

15 Claims, 3 Drawing Figures

JACKET FOR FLOPPY DISK

BACKGROUND OF THE INVENTION

The invention relates to a jacket for a floppy disk.

A floppy disk is rotatable, flexible disk coated with magnetizable material in a jacket. According to U.S. Pat. No. 4,414,597, a common, known jacket consists of a polyvinylchloride (hereinafter PVC) or another film exterior with an internal, nonwoven liner. The purposes of the film exterior are to provide the jacket with the stability and flexibility necessary for storage, handling, and use and to provide the magnetizably-coated disk with the necessary protection from mechanical damage from without. The main purposes of the liner are to gently pick up any dust particles on the magnetizable coating and to assure a low, uniform torque on the magnetizable disk in the jacket during rotational operation. The liner also prevents the magnetizable coating from coming directly into contact with the exterior film material which, in the case of PVC film, for example, could scratch it.

Floppy disk jackets with a PVC film exterior have a temperature stability of from about 10° C. to about 70° C. which is dictated by the thermal characteristics of PVC film. Difficulties from the temperature stability of such floppy disk jackets, for example from storage in motor vehicles, in sunny work areas behind glass, and on the cooling heat-transfer surfaces of office machines, have necessitated a search for new jacket materials which can replace the PVC.

Furthermore, the lack of porosity in PVC film can lead, undesirably, to condensation on the floppy disk under sufficient, cooling temperature conditions in the presence of moisture. Because putting perforations through the film has not brought reasonable relief, it has been necessary to seek suitable substitute materials for this reason as well.

It is also often desirable to write on the jacket of a floppy disk in use, for example to identify the material magnetically recorded thereon, or to imprint it before use, for example with advertising or other identification. Writing and imprinting media free of organic solvents, for example ordinary fiber-tip pen ink, ball-point pen ink, and pencil "lead", are not, therefore, suitable for writing on PVC film. As a result, pressure-sensitive labels are often placed on floppy disk jackets, but the ability to identify a disk jacket without using a pressure-sensitive label would considerably improve their handling. A substitute for a PVC cover is, therefore, desirable from this point of view, too.

In any case, however, the desirable dust and drag properties of the liner should be provided or preserved.

German patent publication No. 23 25 715 describes a protective envelope for a data medium stationary therein, and especially a video disk, having a cover of paper or an unspecified plastic with a liner of a nonwoven fiber coating. Such an envelope is temperature stable within wide limits. Also, the paper solves the problem of being able to write on or imprint the envelope. The envelope cannot, however, have all the specific mechanical properties required for protecting a flexible, rotating floppy disk such as tensile strength and scratch resistance, for example. Moreover, even when the nonwoven liner is laminated onto paper, the permeability of the nonwoven liner to moisture is so reduced by the paper that the envelope, in this regard, has virtually the same undesirable properties as the PVC film jacket cited above. This circumstance is not so very important if the envelope, as described in the patent publication, serves only for storing and handling the data medium and the latter is outside of the envelope during operation. This is not the case, however, for a floppy disk, which remains in its jacket and moves in it during use, and such a material is, therefore, unsuitable for it.

UK patent publication No. A 20 96 194 describes a sleeve of nonwoven fabric for a jacket for a phonograph record and it mentions the possibility of its use for a floppy disk. This sleeve has, however, the purpose of protecting the phonograph record or floppy disk in a jacket only during storage and handling, i.e., non-rotationally outside of the disk drive. The requirements for this are entirely different on account of the different type of application. The teaching of this patent is, therefore, not applicable to jackets which both envelop, i.e. jacket, and contact floppy disks.

SUMMARY OF THE INVENTION

The invention is addressed to the problems of developing a jacket for a floppy disk which will avoid the use of PVC film, is simple to produce, and is stable at temperatures above 80° C. The exterior of the jacket is to be highly, but finely porous to provide an improved exchange of moisture through the jacket, but not dust penetration. The exterior is also to be capable of being written upon and/or imprinted with ordinary materials and by ordinary methods. The desirable properties of PVC film in the state of the art, for example durability, flexibility, wear-resistance, weldability and thickness, are to be substantially preserved. The proven nonwoven liner material is to serve as formerly as the inner lining.

All of these problems are solved in a simple manner by a jacket consisting entirely of nonwoven material both for cover and a liner functional portions.

The cover and liner can be based on one and the same nonwoven material having both a smooth, wear-resistant, and porous exterior which serves the purpose of a cover and a soft, pile inner side which serves the purpose of a liner. Cover and liner are, therefore, of the same material. The nonwoven consists preferably of polyester, polyamide, polyolefin, PVC or heterofil fibers or mixtures thereof.

The nonwoven material can be imprinted on its cover side, for example, by ordinary textile printing methods. Furthermore, this surfaces can be outstandingly suitable, both on the basis of light color and porosity, for marking with ink, ball-point pens or felt-tipped pens. To facilitate markability or imprintability, to increase stiffness, to permit dyeing, or to allow treatment with antistatic agents, the exterior can be provided with the finishes commonly used on nonwoven materials. The jacket, due to the high porposity of the nonwoven material, has a high permeability for moisture through its entire thickness. Sweating is thus reliably prevented. The temperature stability of the jacket is fully assured on the basis of the fiber material used. Last but not least, the jacket of the invention is characterized by high stiffness, as proven by the ratings given in the example.

The jacket can be made up of one, but preferably of more nonwoven layers: the number and order of the individual layers can be controlled in this embodiment according to the desired stiffness and wear resistance.

Preferably, the jacket of the invention, in its multilayer embodiment, is spot-welded in order to assure good moisture permeability and flexibility on the one hand and the permanent bonding together of the individual layers on the other.

For avoidance of disturbances of an electrostatic nature, such as often occur in the operation of magnetic data media, it is conventional to provide the cover and/or liner of floppy disk jackets with electrically conductive materials. This is accomplished very elegantly in the jacket of the invention if a portion of the fibers in the nonwoven material is electrically conductive. By the use of such fibers it is possible to manufacture a jacket in an especially preferred embodiment whose electrical surface resistance $R_{OT}$ (measured per DIN 54 345, Bl. 1) and resistance in depth $R_D$ (measured per DIN 53 482), does not exceed $10^9$ ohms or, preferably, even $10^6$ ohms. Especially suitable fibers of this kind are described in German patent application No. P 33 26 597 (not yet published). The are polypropylene, polyester and/or viscose fibers which contain 20 to 40%, by weight, of carbon black in finely divided form incorporated during spinning.

Thus, there is no need for treating the nonwoven material with an antistatic agent.

EXAMPLE OF A PREFERRED EMBODIMENT

Figure 2:
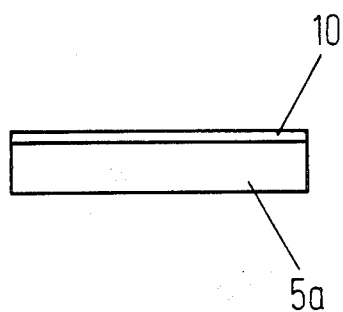
Figure 3:
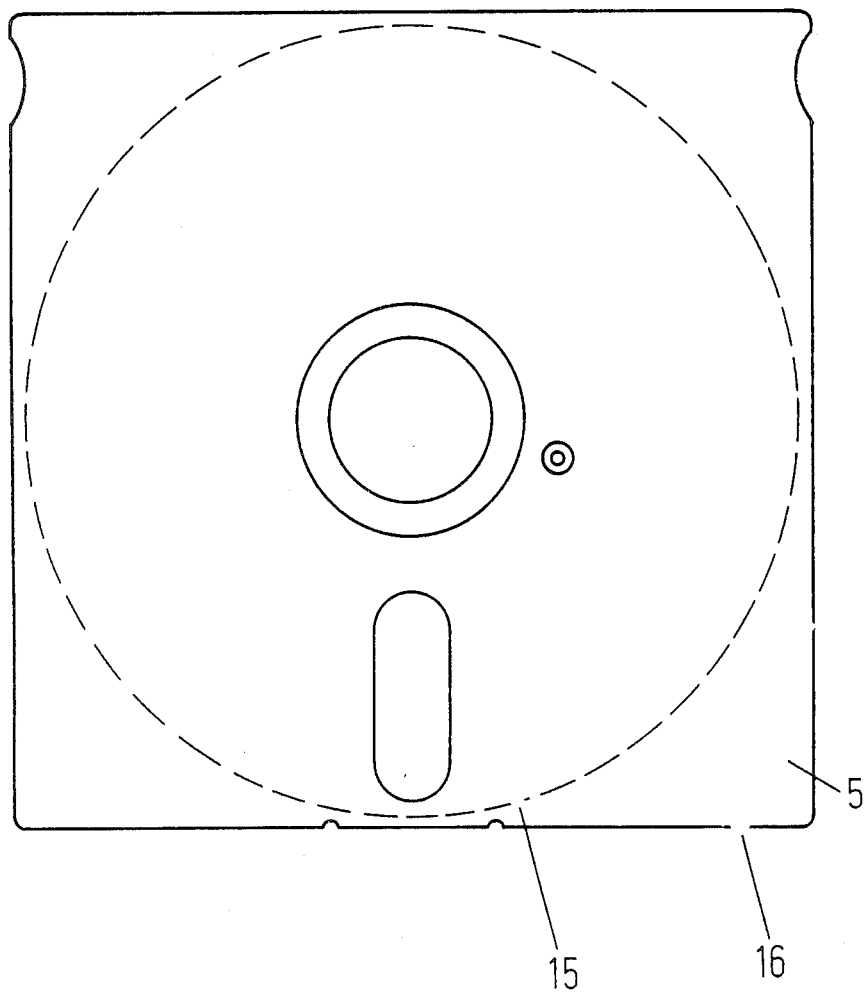

A floppy disk jacket and its manufacture in accordance with the invention are represented by way of example in the appended drawing, wherein:

FIG. 1 represents a single-step manufacturing process for a multiple-layer jacket, FIG. 2 shows the jacket material in elevation, FIG. 3 shows the completed jacket with the floppy disk.

The following example and FIGS. 1 to 3 are intended to explain the construction and properties of a preferred, multi-layer embodiments of the jacket of the present invention, without in any way limiting its scope as laid down in the claims.

A fiber mixture of 100% thermally activatable binding fibers, preferably heterofil fibers on a basis of polyester and copolyester, having a titer of 3.3 dtex and a melting point of 225° C. is laid by means of a card 1, 2, 3, on a conveyor belt 6A to form fiber mat 5 (FIG. 1). This is consolidated in a hot-air oven 7 followed by gauging in a pressing mechanism 8 to form a finely-porous, i.e. writably-smooth, nonwoven fabric 5a. The nonwoven fabric 5a thus obtained has a weight of 200 g/m² and forms the wear-resistant exterior (cover) of the jacket.

A fiber mixture, consisting of 100% polyester homofil fibers with a titer of 1.7 dtex is laid inline onto the nonwoven fabric 5a on a conveyor belt 9 by a card 4 to form a fiber mat thereon. This fiber mat has a weight of 30 g/m². The fiber mat is consolidated and bonded together and, to form a finished material, to the nonwoven fabric 5a by spot welding in a calendar at 11 having a smooth steel roll 13 and an engraved roll 12. The finished material, which has a weight of 230 g/m², is wound up on a winder at 14. It has a structure in accordance with FIG. 2. From this continuous web material a jacket 16 in accordance with the invention can be stamped (FIG. 3), which is folded up and provided with a floppy disk 15.

The jacket 16 is made in the manner described, with a weight of 230 g/m², has the same stiffness characteristics as a corresponding jacket material based on PVC film (approx. 300 g/m² with a nonwoven liner (approx. 35 g/m²) which is commonly used for this purpose.

To express the stiffness numerically, samples of both kinds of jacket were tested with the stiffness tester 58963 made by Frank in Birkenau, under the following conditions (Table 1):

Sample size: 30×70 mm
Angle of flexure: 30°
Distance between jaws: 10 mm
Range of measurement: 5N

TABLE 1

| Sample | Mounting direction | Flexure side | Flexural force × [N] |
|---|---|---|---|
| Nonwoven jacket of the invention | lengthwise | exterior | 0.63 |
| | | liner | 0.70 |
| | transverse | exterior | 0.66 |
| | | liner | 0.70 |
| PVC jacket with liner | lengthwise | film | 0.73 |
| | | liner | 0.93 |
| | transverse | film | 0.64 |
| | | liner | 0.76 |

TABLE 2

| Sample | Mounting direction | Flexure side | Flexural force × [N] |
|---|---|---|---|
| Nonwoven jacket of the invention | lengthwise | exterior | 0.93 |
| | | liner | 0.95 |
| | transverse | exterior | 0.92 |
| | | liner | 1.09 |
| PVC film (cover) without line | — | smooth | 0.99 |
| | | embossed | 1.00 |

It will be understood taht the specification and examples are illustrative but not limitative of the present invention and that other embodiments within the spirit and scope of the invention will suggest themselves to those skilled in the art.

What is claimed is:

1. A floppy disk jacket consisting essentially of a porous, nonwoven fabric, the nonwoven fabric being in at least one layer having, when formed into a jacket, a writably-smooth and wear-resistant, highly-porous but finely-porous exterior, and a soft, porous, fibrous inner side for facing a floppy disk in the jacket, for providing an exchange of moisture through the jacket but not just penetration.

2. The floppy disk jacket of claim 1, wherein both the electrical surface resistance and resistance in depth of the nonwoven fabric does not exceed $10^9$ ohms.

3. The floppy disk jacket of claim 2, wherein the nonwoven fabric contains fibers filled with electrically conductive material sufficiently for providing the resistances.

4. The floppy disk jacket of claim 1, wherein the nonwoven fabric is made of polyester, polyamide, polyolefin, PVC, heterofil fibers or mixtures thereof.

5. The floppy disk jacket of claim 4, wherein both the electrical surface resistance and resistance in depth of the nonwoven fabric does not exceed $10^9$ ohms.

6. The floppy disk jackets of claim 4, wherein the nonwoven fabric has more than one nonwoven layer.

7. The floppy disk jacket of claim 6, wherein both the electrical surface resistance and resistance in depth of the nonwoven fabric does not exceed $10^9$ ohms.

8. The floppy disk jacket of claim 6, wherein the nonwoven layers are spot-welded to one another.

9. The floppy disk jacket of claim 8, wherein both the electrical surface resistance and resistance in depth of the nonwoven fabric does not exceed $10^9$ ohms.

10. The floppy disk jackets of claim 1, wherein the nonwoven fabric has more than one nonwoven layer.

11. The floppy disk jacket of claim 10, wherein both the electrical surface resistance and resistance in depth of the nonwoven fabric does not exceed $10^9$ ohms.

12. The floppy disk jacket of claim 11, wherein the nonwoven fabric contains fibers filled with electrically conductive material sufficiently for providing the resistances.

13. The floppy disk jacket of claim 10, wherein the nonwoven layers are spot-welded to one another.

14. The floppy disk jacket of claim 13, wherein both the electrical surface resistance and resistance in depth of the nonwoven fabric does not exceed $10^9$ ohms.

15. The floppy disk jacket of claim 14, wherein the nonwoven fabric contains fibers filled with electrically conductive material sufficiently for providing the resistances.

* * * * *